US006932264B2

(12) United States Patent
Wagner et al.

(10) Patent No.: US 6,932,264 B2
(45) Date of Patent: Aug. 23, 2005

(54) METHOD FOR MAKING A HEAT EXCHANGER WITH SOLDERED PLATES AND RESULTING HEAT EXCHANGER

(75) Inventors: Marc Wagner, Saint Maur (FR); Sophie Wastiaux, Sevran (FR); Norbert Niclout, Archettes (FR)

(73) Assignees: L'Air Liquide, Société Anonyme à Directoire et Conseil de Surveillance pour l'Etude et l'Exploitation des Procedes Georges Claude, Paris (FR); Nordon Cryogénie, Colbey (FR)

(*) Notice: Subject to any disclaimer, the term of this patent is extended or adjusted under 35 U.S.C. 154(b) by 147 days.

(21) Appl. No.: 10/415,079

(22) PCT Filed: Oct. 26, 2001

(86) PCT No.: PCT/FR01/03344

§ 371 (c)(1),
(2), (4) Date: Apr. 24, 2003

(87) PCT Pub. No.: WO02/34448

PCT Pub. Date: May 2, 2002

(65) Prior Publication Data

US 2004/0129412 A1 Jul. 8, 2004

(30) Foreign Application Priority Data

Oct. 27, 2000 (FR) .............................................. 0013858

(51) Int. Cl.$^7$ .............................................. B23K 31/00
(52) U.S. Cl. ...................................... 228/183; 228/194
(58) Field of Search ................................. 228/183, 194, 228/193, 209, 254, 256

(56) References Cited

U.S. PATENT DOCUMENTS

| 4,606,797 A | * | 8/1986 | Taylor et al. | ................ 205/567 |
| 4,831,701 A | * | 5/1989 | Yutaka | ................... 29/890.054 |
| 5,005,285 A | * | 4/1991 | Ishii | ....................... 29/890.043 |

FOREIGN PATENT DOCUMENTS

| DE | 36 13 596 | 11/1987 |
| FR | 2 721 384 | 12/1995 |
| WO | WO 96 06705 | 3/1996 |

OTHER PUBLICATIONS

International Search Report for PCT/FR01/03344, no date avail.

\* cited by examiner

*Primary Examiner*—Jonathan Johnson
(74) *Attorney, Agent, or Firm*—Linda K. Russell

(57) ABSTRACT

A method for producing a plate heat exchanger with multiple plates made of a solderable material. The plated define circuits for fluid circulation and are assembled together by soldering. The soldering is done after a soldering material is applied to the regions to be soldered. The soldering material is deposited on the plates with an electrolytic solution.

19 Claims, No Drawings

METHOD FOR MAKING A HEAT EXCHANGER WITH SOLDERED PLATES AND RESULTING HEAT EXCHANGER

BACKGROUND

The invention relates to the field of heat exchangers manufactured by assembling brazed plates.

Reboiler/condensers for air separation units have in general, for several decades, been produced from aluminum or aluminum alloy by means of plates brazed together. They may also be made of copper, nickel, stainless steel or any other brazeable metal. These exchangers generally consist of two or more circuits, defined by the configuration of the plates of which they are composed and of the possible separating elements of the plates such as heat-exchange fins that the exchanger may contain. The various fluid circulation circuits are connected to the rest of the plant via a system of pipes welded to the exchanger.

The material serving to form the braze is conventionally deposited by depositing a powder, wires or foils onto the regions of the exchanger to be brazed. The material may be deposited in this way either on the plates of the exchanger or on the heat-exchange fins. Given the number and length of the regions to be brazed, the operation of depositing the brazing material is very expensive and not very reliable. In the case of powders, the problem arises as to their distribution over the brazing region. When wires or foils are deposited, these may have undulations and pleats which make the effectiveness of the brazing random. Moreover, in general the materials used for the braze are often noble alloys, for example containing silver in a large amount. Since these alloys are very expensive, it would be beneficial to minimize as far as possible the amount of brazing alloy used, without correspondingly compromising the quality of the brazing.

The object of the invention is to provide manufacturers of plate heat exchangers with a method of assembly by brazing which is both less expensive and more reliable than the conventional assembly methods.

SUMMARY

For this purpose, the subject of the invention is a process for manufacturing a plate heat exchanger of the type comprising a plurality of plates made of a brazeable material, which define circuits for the circulation of fluids and are joined together by brazing, said brazing taking place after a brazing material has been deposited on the regions to be brazed, characterized in that said brazing material is deposited by means of an electrolytic solution.

DESCRIPTION OF PREFERRED EMBODIMENTS

Said exchanger may include separating fins inside said circuits and said brazing material is deposited either on said plates or on said fins.

Said brazing material is preferably deposited as a layer from 5 to 50 μm in thickness.

It comprises at least one of the elements chosen from silver, arsenic, copper, manganese, nickel, tin, phosphorus, silicon, beryllium and tellurium.

It may be deposited in the form of several superposed layers, each composed of a different element.

Prior to brazing, a heat treatment may be carried out in order to make said superposed layers diffuse into one another.

The subject of the invention is also a plate heat exchanger of the type comprising a plurality of plates made of a brazeable material, characterized in that it can be obtained by the above process.

As will have been understood, the invention consists in depositing, using an electrolytic process, the material by means of which the brazing will be carried out. The brazing material may be deposited, as the manufacturer chooses, either on the plates or on the heat-exchange fins. However, deposition on the plates is the most advantageous, since in this way smaller amounts of brazing material are used.

The brazing materials that can be deposited by this process are silver, arsenic, copper, manganese, nickel, tin, phosphorous, silicon, beryllium and tellurium. They may be deposited singly or, if required, in the form of a codeposit. In general, it is endeavored to carry out the electroplating of materials or of alloys that it is conventionally known to use as brazing materials for assembling known heat exchangers.

The invention is particularly advantageous if it is desired to deposit a silver layer. This is because it is possible, by this process, to obtain plating thicknesses of less than 10 μm in a very uniform manner and over large areas. In this way, one is assured of obtaining optimum plating quality for a minimum amount of silver used.

Once the brazing material has been deposited and the exchanger assembled, the brazing is carried out by putting the exchanger in an oven which raises it to a temperature suitable for producing the braze, as is already known.

When it is desired to use a brazing material which comprises a plurality of elements in defined proportions, and when it is not possible to obtain this alloy in the form of a single layer which would be obtained by co-electroplating, one possible procedure is as follows. Firstly, electroplating is carried out to deposit a layer of a first element involved in the composition of the brazing material. A second layer, of another of the elements involved in the composition of the brazing alloy, is then deposited on this first layer, and then, possibly, other layers of other elements that it is desired to be present in the brazing alloy are deposited. Next, a diffusion heat treatment may be carried out allowing the various superposed layers to join together into what is referred to as a single alloy layer of more or less homogeneous composition, prior to the brazing operation. However, in certain cases it is possible for this mixing of the various layers to be carried out during the brazing operation itself. The brazing alloy of the desired composition is therefore obtained during the brazing operation. Which of the two methods is chosen depends especially on whether or not it is possible for the various materials to diffuse into one another at temperatures below the brazing temperature.

The invention is applicable to any type of brazed-plate exchanger whatever its application, reboiler/condensers for an air separation unit being merely one preferred application example.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for manufacturing a plate heat exchanger of the type comprising a plurality of plates made of a brazeable material, which define circuits for the circulation of fluids and are joined together by brazing, said brazing taking place after a brazing material has been deposited on the regions to be brazed, wherein said brazing material is deposited by means of an electrolytic solution.

2. The process of claim 1, wherein said exchanger includes separating fins inside said circuits and in that said brazing material is deposited on said plates.

3. The process of claim 1, wherein said exchanger includes separating fins inside said circuits and in that said brazing material is deposited on said fins.

4. The process of claim 1, wherein said exchanger includes separating fins inside said circuits and in that said brazing material is deposited on said plates and on said fins.

5. The process of claim 1, wherein said brazing material is deposited as a layer of about 50 µm or less in thickness.

6. The process of claim 5, wherein said brazing material is deposited as a layer of from about 5 to about 50 µm in thickness.

7. The process of claim 1, wherein the brazing material comprises at least one of the elements chosen from silver, arsenic, copper, manganese, nickel, tin, phosphorus, silicon, beryllium and tellurium.

8. The process of claim 7, wherein the brazing material comprises silver.

9. The process of claim 1, wherein the brazing material is deposited in the form of several superposed layers, each composed of a different element.

10. The process of claim 9, wherein the brazing material is deposited in the form of several superposed layers, each composed of a different element, wherein at least one layer comprises silver.

11. The process of claim 1, wherein, prior to brazing, a heat treatment is carried out in order to make said superposed layers diffuse into one another.

12. A process for joining together plates made of brazeable material by means of brazing, said brazing taking place after the regions to be brazed has had a brazing material deposited upon it by means of an electrolytic solution.

13. A process for manufacturing a plate heat exchanger of the type comprising a plurality of plates made of brazing material that are joined together by brazing, said brazing taking place after the regions to be brazed has had a brazing material deposited upon it by means of an electrolytic solution.

14. A process for manufacturing a plate heat exchanger of the type used in cryogenic service, comprising a plurality of plates made of brazing material which are joined together by brazing, said brazing taking place after a brazing material has been deposited on the regions to be brazed, wherein said brazing material is deposited by means of an electrolytic solution.

15. A process for manufacturing a cryogenic service plate heat exchanger of the type comprising of a plurality of plates made of brazing material which are joined together by brazing, said brazing taking place after the regions to be brazed has had a brazing material deposited upon it by means of an electrolytic solution.

16. A process for manufacturing a cryogenic service plate heat exchanger of the type comprising of a plurality of plates made of a brazing material which are joined together by brazing, said brazing taking place after a brazing material has been deposited on the regions to be brazed, wherein said brazing material is deposited by means of an electrolytic solution.

17. The process of claim 9, wherein after said brazing material has been deposited, the brazing is carried out in an oven.

18. The process of claim 10, wherein after said brazing material has been deposited, the brazing is carried out by putting the heat exchanger into an oven, wherein said oven is then elevated to a temperature suitable for producing the braze.

19. The process of claim 11, wherein after said brazing material has been deposited and the exchanger plates assembled, the brazing is carried out by putting the exchanger in an oven, wherein said oven is then elevated to a temperature suitable for producing the braze.

* * * * *